US006754221B1

United States Patent
Whitcher et al.

(10) Patent No.: US 6,754,221 B1
(45) Date of Patent: Jun. 22, 2004

(54) SYSTEM AND METHOD FOR SELECTING A COMPRESSION ALGORITHM ACCORDING TO AN AVAILABLE BANDWIDTH

(75) Inventors: Robert H. Whitcher, Austin, TX (US); David N. Miller, Austin, TX (US); Eric Sean Parham, Austin, TX (US)

(73) Assignee: General Bandwidth Inc., Austin, TX (US)

( * ) Notice: Subject to any disclaimer, the term of this patent is extended or adjusted under 35 U.S.C. 154(b) by 378 days.

(21) Appl. No.: 09/785,391

(22) Filed: Feb. 15, 2001

(51) Int. Cl.[7] .............................................. H04L 12/28

(52) U.S. Cl. ........................ 370/401; 370/468; 370/477

(58) Field of Search ................................. 370/401, 468, 370/477, 469, 465, 476, 474, 352, 356, 442, 400, 399, 236, 485, 353, 494, 402, 495; 379/3 T, 93.14, 93.28

(56) References Cited

U.S. PATENT DOCUMENTS

| | | | |
|---|---|---|---|
| 4,381,427 A | 4/1983 | Cheal et al. ............... | 179/2 DP |
| 4,493,092 A | 1/1985 | Adams ........................ | 375/36 |
| 4,504,942 A | 3/1985 | Aro et al. ...................... | 370/58 |
| 4,507,793 A | 3/1985 | Adams ........................ | 375/36 |
| 4,512,025 A | 4/1985 | Frankel et al. ................. | 375/36 |
| 4,578,537 A | 3/1986 | Faggin et al. .............. | 179/2 DP |
| 4,608,686 A | 8/1986 | Barsellotti .................. | 370/69.1 |
| 4,627,046 A | 12/1986 | Bellamy ....................... | 370/58 |
| 4,740,963 A | 4/1988 | Eckley ..................... | 370/110.1 |
| 4,748,656 A | 5/1988 | Gibbs et al. ................... | 379/93 |
| 4,853,949 A | 8/1989 | Schorr et al. .................... | 379/2 |
| 4,881,226 A | 11/1989 | Lechner et al. .......... | 370/110.1 |
| 4,903,292 A | 2/1990 | Dillon .......................... | 379/93 |
| 5,029,164 A * | 7/1991 | Goldstein et al. ........... | 370/235 |
| 5,033,062 A | 7/1991 | Morrow et al. ................. | 375/7 |
| 5,034,948 A | 7/1991 | Mizutani et al. .............. | 370/79 |
| 5,042,028 A | 8/1991 | Ogawa ...................... | 370/58.2 |
| 5,127,003 A | 6/1992 | Doll, Jr. et al. .......... | 370/110.1 |

(List continued on next page.)

FOREIGN PATENT DOCUMENTS

| | | | |
|---|---|---|---|
| EP | 0 841 831 A2 | 5/1998 | ........... H04Q/11/04 |
| EP | 0 895 374 A2 | 2/1999 | ........... H04L/12/24 |
| EP | 0 905 939 A2 | 3/1999 | ............. H04L/1/00 |
| EP | 1 024 638 A1 | 8/2000 | ........... H04L/29/06 |
| WO | WO97/23078 | 6/1997 | ........... H04L/12/56 |
| WO | WO 97/37458 | 10/1997 | |
| WO | WO 99/49608 | 9/1999 | |
| WO | WO 01/06720 | 1/2001 | ........... H04Q/11/04 |

OTHER PUBLICATIONS

Unknown Author, "Specification of (DBCES) Dynamic Bandwidth Utilization—In 64KBPS Time Slot Trunking Over ATM—Using CES," The ATM Forum Technical Committee, AF–VTOA–0085.000, 36 pages, Jul. 1997.

Gudapati, et al., "Local Telephone Service for Cable Subscribers Using Packet Switched Access," ISS. World Telecommunications Congress, pp. 325–329, Sep. 21, 1997.

*Primary Examiner*—Chi Pham
*Assistant Examiner*—Alexander O. Boakye
(74) *Attorney, Agent, or Firm*—Baker Botts L.L.P.

(57) ABSTRACT

A gateway for communicating telecommunication information between a telecommunication network and customer premises equipment, includes a telecommunication interface, a management module, compression modules, and packetization modules. The telecommunication interface receives telecommunication information from the telecommunication network for communication to the customer premises equipment. The management module determines a bandwidth available to communicate the telecommunication information to the customer premises equipment and selects a compression algorithm according to the available bandwidth. The compression modules compress the telecommunication information using the selected compression algorithm, and the packetization modules generate data packets for communicating the telecommunication information.

23 Claims, 8 Drawing Sheets

U.S. PATENT DOCUMENTS

| | | | |
|---|---|---|---|
| 5,134,611 A | 7/1992 | Steinka et al. | 370/79 |
| 5,142,568 A | 8/1992 | Ogata et al. | 379/100 |
| 5,142,571 A | 8/1992 | Suzuki et al. | 379/279 |
| 5,151,923 A | 9/1992 | Fujiwara | 375/5 |
| 5,216,704 A | 6/1993 | Williams et al. | 379/93 |
| 5,220,560 A | 6/1993 | Ogasawara | 370/79 |
| 5,267,300 A | 11/1993 | Kao et al. | 379/93 |
| 5,305,312 A | 4/1994 | Fornek et al. | 370/62 |
| 5,317,627 A | 5/1994 | Richardson, Jr. et al. | 379/88 |
| 5,349,640 A | 9/1994 | Dunn et al. | 379/387 |
| 5,410,343 A | 4/1995 | Coddington et al. | 348/7 |
| 5,426,692 A | 6/1995 | Fujise | 379/93 |
| 5,448,635 A | 9/1995 | Biehl et al. | 379/399 |
| 5,459,788 A | 10/1995 | Kim | 379/399 |
| 5,473,675 A | 12/1995 | Chapman et al. | 379/93 |
| 5,479,447 A | 12/1995 | Chow et al. | 375/260 |
| 5,499,241 A | 3/1996 | Thompson et al. | 370/73 |
| 5,535,198 A | 7/1996 | Baker et al. | 370/60 |
| 5,604,737 A | 2/1997 | Iwami et al. | 370/352 |
| 5,610,922 A | 3/1997 | Balatoni | 370/468 |
| 5,617,423 A | 4/1997 | Li et al. | 370/426 |
| 5,625,685 A | 4/1997 | Allegranza et al. | 379/399 |
| 5,638,363 A | 6/1997 | Gittins et al. | 370/358 |
| 5,649,299 A | 7/1997 | Battin et al. | 455/62 |
| 5,661,785 A | 8/1997 | Carpenter et al. | 379/93.15 |
| 5,668,857 A | 9/1997 | McHale | 379/93.07 |
| 5,671,251 A | 9/1997 | Blackwell et al. | 375/222 |
| 5,673,290 A | 9/1997 | Cioffi | 375/260 |
| 5,675,575 A | 10/1997 | Wall, Jr. et al. | 370/326 |
| 5,719,870 A | 2/1998 | Baker et al. | 370/463 |
| 5,737,333 A | 4/1998 | Civanlar et al. | 370/352 |
| 5,771,236 A | 6/1998 | Sansom et al. | 370/458 |
| 5,781,547 A | 7/1998 | Wilson | 370/395 |
| 5,781,617 A | 7/1998 | McHale et al. | 379/93.14 |
| 5,787,088 A | 7/1998 | Dagdeviren et al. | 370/493 |
| 5,828,666 A | 10/1998 | Focsaneanu et al. | 370/389 |
| 5,838,682 A | 11/1998 | Dekelbaum et al. | 370/401 |
| 5,841,840 A | 11/1998 | Smith et al. | 379/93.01 |
| 5,848,150 A | 12/1998 | Bingel | 379/399 |
| 5,864,747 A | 1/1999 | Clark et al. | 455/3.2 |
| 5,881,142 A | 3/1999 | Frankel et al. | 379/167 |
| 5,883,941 A | 3/1999 | Akers | 379/93.08 |
| 5,889,773 A | 3/1999 | Stevenson, III | 370/352 |
| 5,889,856 A | 3/1999 | O'Toole et al. | 379/399 |
| 5,896,377 A | 4/1999 | Boot et al. | 370/352 |
| 5,898,761 A | 4/1999 | McHale et al. | 379/93.01 |
| 5,901,205 A | 5/1999 | Smith et al. | 379/93.01 |
| 5,905,781 A | 5/1999 | McHale et al. | 379/93.14 |
| 5,917,814 A | 6/1999 | Balatoni | 370/352 |
| 5,940,479 A | 8/1999 | Guy et al. | 379/93.01 |
| 5,943,404 A | 8/1999 | Sansom et al. | 379/93.06 |
| 5,978,390 A | 11/1999 | Balatoni | 370/540 |
| 5,999,565 A | 12/1999 | Locklear, Jr. et al. | 375/222 |
| 5,999,598 A | 12/1999 | Henrick et al. | 379/93.07 |
| 6,075,784 A | 6/2000 | Frankel et al. | 370/356 |
| 6,181,715 B1 | 1/2001 | Phillips et al. | 370/493 |
| 6,327,364 B1 * | 12/2001 | Shaffer et al. | 379/265.02 |
| 6,466,651 B1 * | 10/2002 | Dailey | 379/37 |
| 6,512,762 B1 * | 1/2003 | Renucci et al. | 370/352 |
| 6,526,046 B1 * | 2/2003 | Carew | 370/352 |

* cited by examiner

| CUSTOMER PREMISES EQUIPMENT | TOTAL BANDWIDTH (Kbps) | BANDWIDTH RESERVED FOR DATA (Kbps) | BANDWIDTH RESERVED FOR VOICE (Kbps) | BANDWIDTH ALLOCATED FOR DATA (Kbps) | BANDWIDTH ALLOCATED FOR VOICE (Kbps) | BANDWIDTH AVAILABLE FOR VOICE (Kbps) | AVAILABLE VOICE COMPRESSION ALGORITHMS |
|---|---|---|---|---|---|---|---|
| IAD #23 | 1500 | 500 | 500 | 400 | 924 | 76 | G.711 G.723 |
| MTA #35 | 3000 | . | 1000 | 1700 | 800 | 500 | G.711 G.728 |
| ... | ... | ... | ... | ... | ... | ... | ... |
| WNIU #61 | 1200 | . | . | 600 | 400 | 200 | G.711 G.723 G.728 |

200

| CUSTOMER PREMISES EQUIPMENT (252) | SUBSCRIBER IDENTIFIER (254) | CLASS OF SERVICE (256) | SUBSCRIBER LINE STATUS (258) | VOICE COMPRESSION ALGORITHM (260) | BANDWIDTH ALLOCATED FOR VOICE (Kbps) (262) |
|---|---|---|---|---|---|
| IAD #23 | 1 | 1 | . | . | . |
| | 2 | 1 | ACTIVE | G.711 | 64 |
| | 3 | 1 | ACTIVE | G.711 | 64 |
| | 4 | 1 | ACTIVE | G.711 | 64 |
| | 5 | 2 | . | . | . |
| | 6 | 2 | ACTIVE | G.729 | 8 |
| | 7 | 2 | ACTIVE | G.722 | 32 |
| | 8 | 2 | ACTIVE | G.729 | 8 |
| | 9 | 2 | . | . | . |
| | 10 | 2 | ACTIVE | G.729 | 8 |
| | 11 | 2 | ACTIVE | G.729 | 8 |
| | 12 | 2 | ACTIVE | G.722 | 32 |
| | 13 | 2 | ACTIVE | G.722 | 32 |
| | 14 | 1 | ACTIVE | G.711 | 64 |
| | 15 | 2 | . | . | . |
| | 16 | 1 | ACTIVE | G.711 | 64 |
| | 17 | 1 | . | . | . |
| | 18 | 1 | ACTIVE | G.711 | 64 |
| | 19 | 2 | . | . | . |
| | 20 | 2 | ACTIVE | G.722 | 32 |
| | 21 | 2 | ACTIVE | G.729 | 8 |
| | 22 | 2 | ACTIVE | G.729 | 8 |
| | 23 | 2 | ACTIVE | G.722 | 32 |
| | 24 | 2 | ACTIVE | G.722 | 32 |

| 300 | | T1 | T2 | T3 | T4 | T5 | T6 | T7 |
|---|---|---|---|---|---|---|---|---|
| 302 | TOTAL BANDWIDTH | 500 | 500 | 500 | 450 | 450 | 500 | 500 |
| 304 | BANDWIDTH ALLOCATED FOR DATA | 300 | 300 | 300 | 300 | 300 | 300 | 300 |
| 306 | BANDWIDTH ALLOCATED FOR VOICE | 0 | 64 | 128 | 128 | 144 | 144 | 160 |
| 308 | AVAILABLE BANDWIDTH | 200 | 136 | 72 | 22 | 6 | 56 | 40 |
| 310 | SUBSCRIBER 1 | . | G.711 | G.711 | G.711 | G.711 | G.711 | G.711 |
| 312 | SUBSCRIBER 2 | . | . | G.711 | G.711 | G.711 | G.711 | G.711 |
| 314 | SUBSCRIBER 3 | . | . | . | . | G.728 | G.728 | G.728 |
| 316 | SUBSCRIBER 4 | . | . | . | . | . | . | G.728 |

FIG. 6

| 350 | | T1 | T2 | T3 | T4 | T5 | T6 | T7 |
|---|---|---|---|---|---|---|---|---|
| 352 | TOTAL BANDWIDTH | 500 | 500 | 500 | 500 | 500 | 500 | 500 |
| 354 | BANDWIDTH ALLOCATED FOR DATA | 300 | 300 | 350 | 350 | 350 | 300 | 300 |
| 356 | BANDWIDTH ALLOCATED FOR VOICE | 0 | 64 | 64 | 80 | 96 | 96 | 160 |
| 358 | AVAILABLE BANDWIDTH | 200 | 136 | 86 | 70 | 54 | 104 | 40 |
| 359 | THRESHOLD BANDWIDTH | 64 | 48 | 48 | 32 | 16 | 16 | 0 |
| 360 | SUBSCRIBER 1 | . | G.711 | G.711 | G.711 | G.711 | G.711 | G.711 |
| 362 | SUBSCRIBER 2 | . | . | . | G.728 | G.728 | G.728 | G.728 |
| 364 | SUBSCRIBER 3 | . | . | . | . | G.728 | G.728 | G.728 |
| 366 | SUBSCRIBER 4 | . | . | . | . | . | . | G.711 |

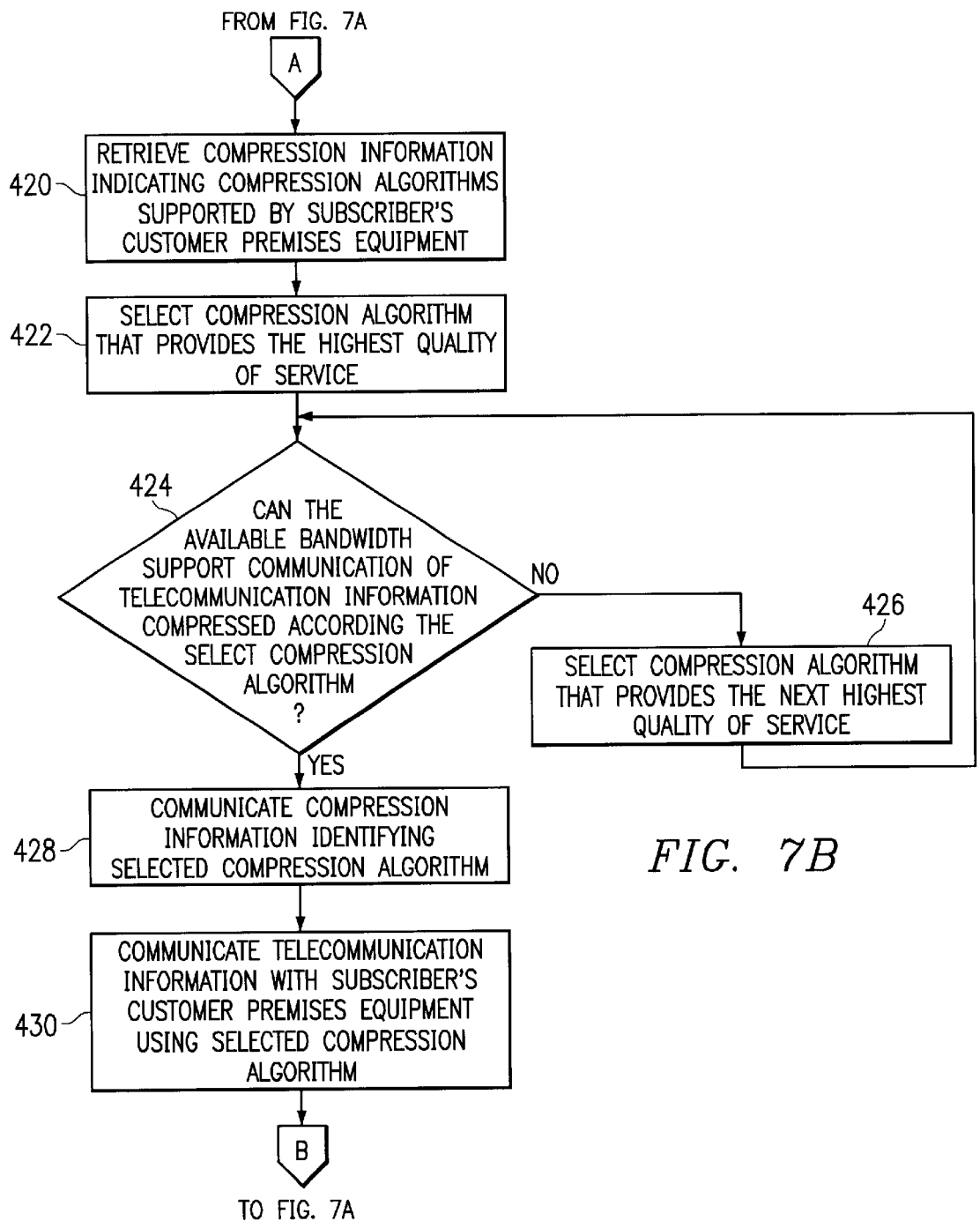

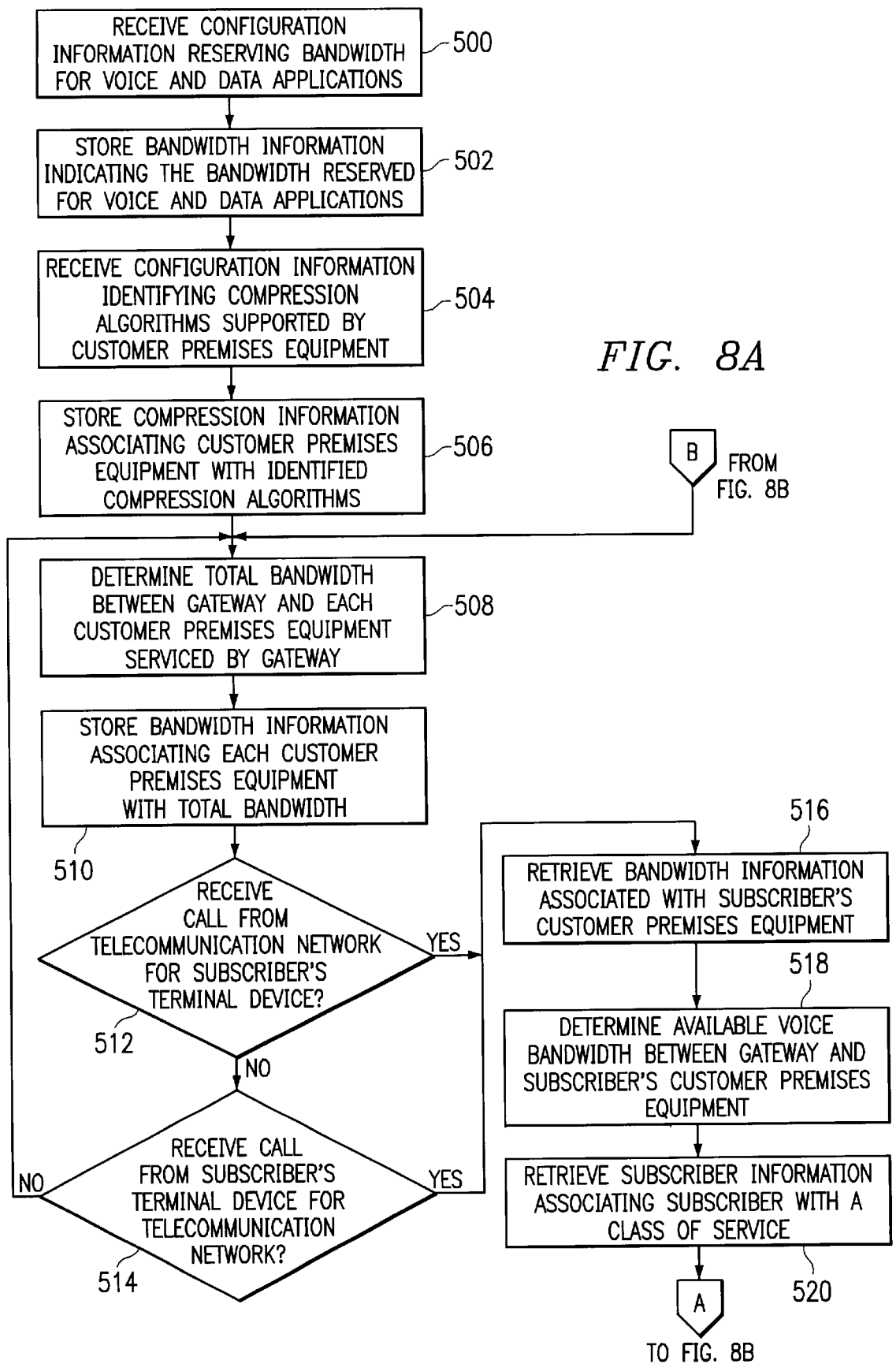

SYSTEM AND METHOD FOR SELECTING A COMPRESSION ALGORITHM ACCORDING TO AN AVAILABLE BANDWIDTH

TECHNICAL FIELD OF THE INVENTION

This invention relates generally to the field of communications and, more particularly, to a system and method for selecting a compression algorithm according to an available bandwidth.

BACKGROUND OF THE INVENTION

The public switched telephone network (PSTN) is a circuit-switched network that uses dedicated lines to communicate telephone calls. At a central office, a digital Class 5 switch receives analog telephone signals from a user, digitizes the analog telephone signals, and then multiplexes the digital signals over a network of circuit-switched backbone transport lines. An interexchange carrier (IXC) transports the call to a destination Local Access Transport Area (LATA), where it is handed to a local service provider and reconverted to an analog signal for delivery to a second user.

As the Internet has driven demand for greater bandwidth over data networks, new broadband technologies have emerged that allow the delivery of telephone calls using data packets communicated over broadband networks. Unfortunately, current solutions have been technology dependent, supporting only a single architecture and lacking the ability to adapt to dynamic conditions.

SUMMARY OF THE INVENTION

In accordance with the present invention, a system and method for selecting a compression algorithm according to an available bandwidth is provided that substantially eliminates or reduces disadvantages or problems associated with previously developed systems and methods.

In one embodiment, a gateway for communicating telecommunication information between a telecommunication network and customer premises equipment, includes a telecommunication interface, a management module, a compression module, and a packetization module. The telecommunication interface receives telecommunication information from the telecommunication network for communication to the customer premises equipment. The management module determines a bandwidth available to communicate the telecommunication information to the customer premises equipment and selects a compression algorithm according to the available bandwidth. The compression module compresses the telecommunication information using the selected compression algorithm, and the packetization module generates data packets for communicating the telecommunication information.

In another embodiment, a system for communicating telecommunication information between a telecommunication network and customer premises equipment, includes a gateway. The gateway receives telecommunication information from the telecommunication network for communication to the customer premises equipment. The gateway determines a bandwidth available to communicate the telecommunication information to the customer premises equipment and selects a compression algorithm according to the available bandwidth. The gateway compresses the telecommunication information using the selected compression algorithm and generates data packets for communicating the telecommunication information to the customer premises equipment.

The present invention provides a number of important technical advantages. Unlike previous systems and methods, a gateway selects a compression algorithm for compressing telecommunication information communicated with customer premises equipment according to an available bandwidth between the gateway and the customer premises equipment. The total bandwidth between the gateway and the customer premises equipment depends on static factors (such as the distance between the gateway and the customer premises) and dynamic factors (such as interference by environmental factors). By selecting a compression algorithm based on an available bandwidth, the gateway can take into account these static and dynamic factors, as well as the utilization of bandwidth by the customer premises equipment, to provide a higher level of service to users. For these and other readily apparent reasons, the present invention represents a significant advance over prior art systems and methods.

BRIEF DESCRIPTION OF THE DRAWINGS

FIG. 4 illustrates a table of subscriber information associating each subscriber with a class of service and bandwidth and compression information;

FIG. 5 is a table illustrating the change of bandwidth and selection of compression algorithms over time, where a gateway selects compression algorithms to provide the highest quality of service using available bandwidth;

FIG. 6 is a table illustrating the change of bandwidth and selection of compression algorithms over time, where a gateway selects compression algorithms to maintain a threshold bandwidth;

DETAILED DESCRIPTION OF THE DRAWINGS

Figure 1:
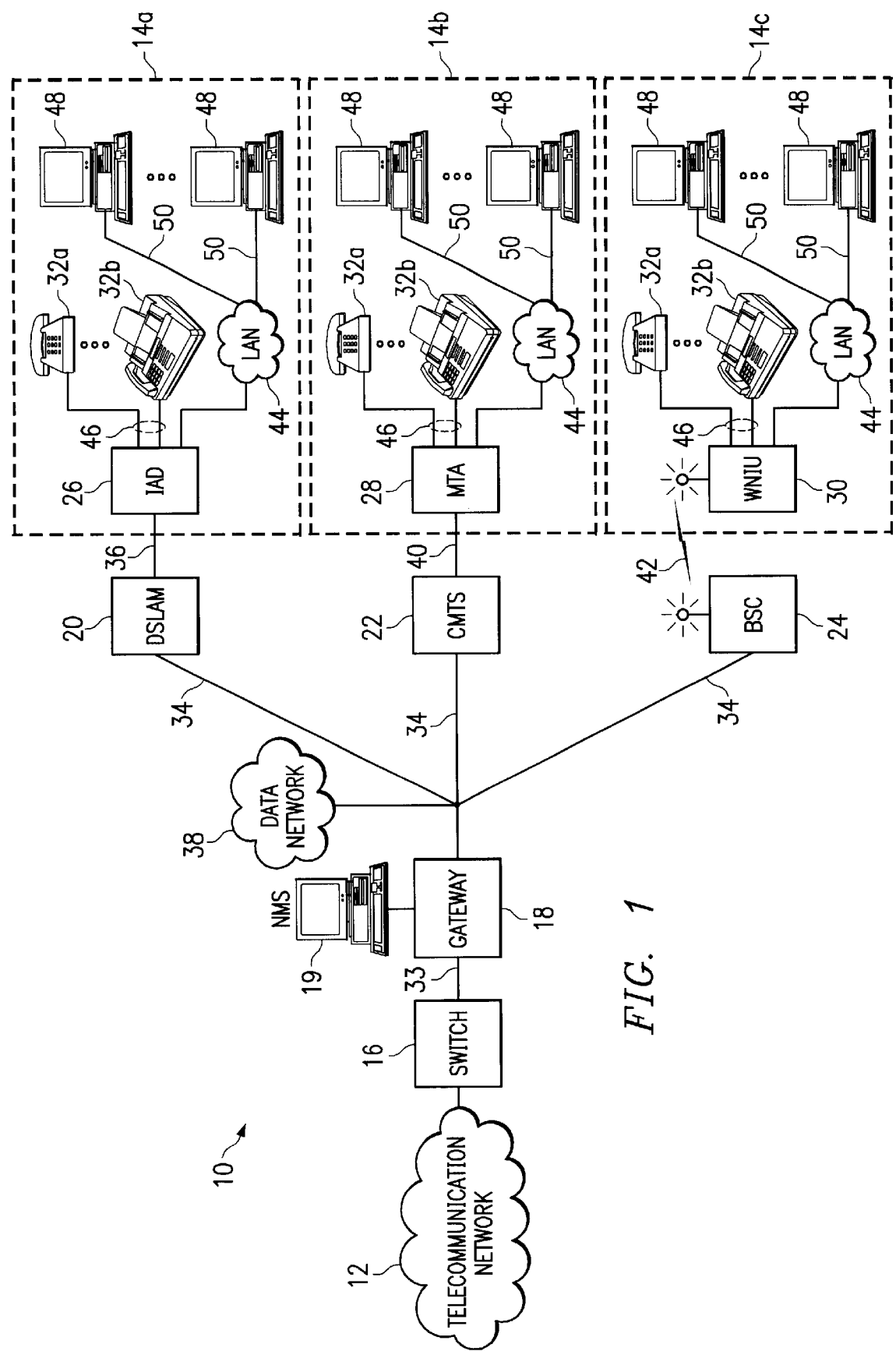
FIG. 1 illustrates a system that selects a compression algorithm for compressing telecommunication information communicated between a telecommunication network and customer premises equipment according to an available bandwidth.

FIG. 1 illustrates a system 10 that selects a compression algorithm for compressing telecommunication information communicated between a telecommunication network 12 and customer premises equipment 14a, 14b, and 14c (collectively, customer premises equipment 14) according to an available bandwidth. System 10 includes a switch 16, a gateway 18, a digital subscriber line access multiplexer (DSLAM) 20, a cable modem termination system (CMTS) 22, a base station controller (BSC) 24, an integrated access device (LAD) 26, a media terminal adapter (MTA) 28, a wireless network interface unit (WNIU) 30, and terminal devices 32*a* and 32*b* (terminal devices 32).

Telecommunication network 12 may be a public switched telephone network, a private switched telephone network, or any other interconnected collection of telecommunication switches that provide local, regional, long distance, or international telephone service. Telecommunication information may include voice, data, image, video, or any other type of information that can be communicated using telecommunication network 12.

Telecommunication switch 16 communicates telecommunication information between telecommunication network 12 and gateway 18. Switch 16 may be a class 4 switch, a class 5 switch, or any other suitable device that communicates telecommunication information with telecommunication network 12.

Gateway 18 performs various compression and protocol conversions to communicate telecommunication information between switch 16 and customer premises equipment 14. To communicate telecommunication information with switch 16, gateway 18 uses GR-303, TR-8, signal system 7 (SS7), V5, integrated services digital network (ISDN) lines, unbundled analog lines, or any other suitable telecommunication interface 33. To communicate telecommunication information with customer premises equipment 14 using a broadband distribution platform, gateway 18 generates data packets encapsulating the telecommunication information according to Internet Protocol (IP), Asynchronous Transfer Mode (ATM), Frame Relay, or any other suitable data communication protocol and communicates the data packets using DS-1 lines, DS-3 lines, OC-3 lines, or any other suitable data links 34. The data packets may be Ethernet frames, IP packets, ATM cells, or any other suitable bundles of data. In addition, to facilitate efficient communication of telecommunication information with customer premises equipment 14, gateway 18 may compress and de-compress telecommunication information using various compression algorithms. Gateway 18 also may selectively perform echo cancellation on the telecommunication information to isolate and filter unwanted noise.

System 10 uses a digital subscriber line (DSL), cable, wireless, satellite, or any other suitable broadband distribution platform to communicate data packets encapsulating telecommunication information between gateway 18 and customer premises equipment 14. Using DSL technology, DSLAM 20 and IAD 26 communicate data packets over local loop circuit 36. CMTS 22 and MTA 28 communicate data packets over cable link 40, and BSC 24 and WNIU 30 communicate data packets over wireless link 42. Although not illustrated in FIG. 1, data switches, routers, or other data communication equipment may be coupled between gateway 18 and DSLAM 20, CMTS 22, and BSC 24 and communicate data packets between gateway 18 and DSLAM 20, CMTS 22, and BSC 24 using IP, ATM, Frame Relay, or any other suitable data communication protocol.

DSLAM 20 and IAD 26 communicate data packets encapsulating telecommunication information between gateway 18 and customer premises equipment 14*a* using DSL technology. DSLAM 20 receives data packets from gateway 18, processes the data packets to generate digital DSL data, and communicates the digital DSL data to IAD 26 using local loop circuit 36. IAD 26 receives the digital DSL data from local loop circuit 36, identifies data packets including telecommunication information for terminal devices 32, processes the identified data packets to generate analog telephone signals, and communicates the analog telephone signals to terminal devices 32 using subscriber lines 46. IAD 26 also receives, from subscriber lines 46, analog telephone signals communicating telecommunication information from terminal devices 32. IAD 26 processes the analog telephone signals to generate data packets including the telecommunication information, processes the data packets to generate digital DSL data, and communicates the digital DSL data to DSLAM 20 using local loop circuit 36. DSLAM 20 receives the digital DSL data from IAD 26 using local loop circuit 36, identifies data packets for delivery to gateway 18, and communicates the identified data packets to gateway 18. Asymmetric DSL (ADSL), integrated DSL (IDSL), symmetric DSL (SDSL), high data rate DSL (HDSL), rate-adaptive DSL (RADSL), very-high data rate DSL (VDSL), DSL-LITE, or other forms of DSL technology allow data transmissions over local loop circuit 36 at greater speeds than offered by traditional dial-up modems. As a result, by using DSL technology, system 10 may support broadband, telecommunication services over local loop circuit 36.

In a particular embodiment, DSLAM 20 and IAD 26 also communicate data packets between data network 38 and local-area network (LAN) 44. Data network 38 may be a wide-area network (WAN), a LAN, the Internet, or any other interconnected collection of switches, routers, or other data communication equipment that provides data services. DSLAM 20 receives data packets from data network 38, processes the data packets to generate digital DSL data, and communicates the digital DSL data to IAD 26 using local loop circuit 36. IAD 26 receives the digital DSL data from local loop circuit 36, identifies data packets for delivery to LAN 44, and communicates the identified data packets to LAN 44. IAD 26 also receives data packets from LAN 44 for delivery to data network 38, processes the data packets to generate digital DSL data, and communicates the digital DSL data to DSLAM 20 using local loop circuit 36. DSLAM 20 receives the digital DSL data from local loop circuit 36, identifies data packets for delivery to data network 38, and communicates the identified data packets to data network 38.

CMTS 22 and MTA 28 communicate data packets encapsulating telecommunication information between gateway 18 and customer premises equipment 14*b* using a cable distribution platform. CMTS 22 receives data packets from gateway 18, processes the data packets for communication over cable link 40, and communicates the data packets to MTA 28 using cable link 40. MTA 28 receives the data packets from cable link 40, identifies data packets including telecommunication information for terminal devices 32, processes the identified data packets to generate analog telephone signals, and communicates the analog telephone signals to terminal devices 32 using subscriber lines 46. MTA 28 also receives, from subscriber lines 46, analog telephone signals communicating telecommunication information from terminal devices 32. MTA 28 processes the analog telephone signals to generate data packets including the telecommunication information, processes the data packets for communication over cable link 40, and communicates the data packets to CMTS 22 using cable link 40. CMTS 22 receives the data packets from MTA 28 using cable link 40, identifies data packets for delivery to gateway 18, and communicates the identified data packets to gateway 18. CMTS 22 and MTA 28 communicate data over cable link 40 at greater speeds than offered by traditional dial-up modems, and as a result, system 10 may support broadband, telecommunication services over cable link 40.

In a particular embodiment, CMTS 22 and MTA 28 also communicate data packets between data network 38 and LAN 44. CMTS 22 receives data packets from data network 38, processes the data packets for communication over cable link 40, and communicates the data packets to MTA 28 using cable link 40. MTA 28 receives the data packets from cable link 40, identifies data packets for delivery to LAN 44, and communicates the identified data packets to LAN 44. MTA 28 also receives data packets from LAN 44 for delivery to data network 38, processes the data packets for communication over cable link 40, and communicates the data packets to CMTS 22 using cable link 40. CMTS 22 receives the data packets from cable link 40, identifies data packets for delivery to data network 38, and communicates the identified data packets to data network 38.

BSC 24 and WNIU 30 communicate data packets encapsulating telecommunication information between gateway 18 and customer premises equipment 14c using a wireless distribution platform. BSC 24 receives data packets from gateway 18, processes the data packets for wireless communication, and communicates the data packets to WNIU 30 using wireless link 42. WNIU 30 receives the data packets from wireless link 42, identifies data packets including telecommunication information for terminal devices 32, processes the identified data packets to generate analog telephone signals, and communicates the analog telephone signals to terminal devices 32 using subscriber lines 46. WNIU 30 also receives, from subscriber lines 46, analog telephone signals communicating telecommunication information from terminal devices 32. WNIU 30 processes the analog telephone signals to generate data packets including the telecommunication information, processes the data packets for wireless communication, and communicates the data packets to BSC 24 using wireless link 42. BSC 24 receives the data packets from WNIU 30 using wireless link 42, identifies data packets for delivery to gateway 18, and communicates the identified data packets to gateway 18. BSC 24 and WNIU 30 communicate data packets over wireless link 42 at greater speeds than offered by traditional dial-up modems, and as a result, system 10 may support broadband, telecommunication services over wireless link 42.

In a particular embodiment, BSC 24 and WNIU 30 also communicate data packets between data network 38 and LAN 44. BSC 24 receives data packets from data network 38, processes the data packets for wireless communication, and communicates the data packets to WNIU 30 using wireless link 42. WNIU 30 receives data packets from wireless link 42, identifies data packets for delivery to LAN 44, and communicates the identified data packets to LAN 44. WNIU 30 also receives data packets from LAN 44 for delivery to data network 38, processes the data packets for wireless communication, and communicates the data packets to BSC 24 using wireless link 42. BSC 24 receives the data packets from WNIU 30 using wireless link 42, identifies data packets for delivery to data network 38, and communicates the identified data packets to data network 38.

Terminal devices 32 may include telephones 32a, facsimile machines 32b, or any other suitable device that communicates telecommunication information using telecommunication network 12. And each subscriber line 46 may support one or more terminal devices 32 and may couple to terminal devices 32 using wireline, wireless, or any other suitable communication path. Personal computers (PCs), network computers (NCs), personal digital assistants, or any other suitable data communication device 48 may communicate data packets with LAN 44 using wireline, wireless, or any other suitable links 50.

Unlike previous systems and methods, gateway 18 selects a compression algorithm for compressing telecommunication information communicated with each customer premises equipment 14 according to an available bandwidth between gateway 18 and each customer premises equipment 14. Gateway 18 stores bandwidth and compression information for each customer premises equipment 14 serviced by gateway 18. In a particular embodiment, the bandwidth information indicates the total bandwidth between gateway 18 and each IAD 26, MTA 28, and WNIU 30; the bandwidth that is reserved for voice, data, or other applications; and the bandwidth that is available for voice, data, or other applications. In a particular embodiment, the compression information indicates one or more compression algorithms supported by each IAD 26, MTA 28, and WNIU 30.

When customer premises equipment 14 is added to system 10, gateway 18 receives configuration information relating to the operation of customer premises equipment 14. Gateway 18 may receive configuration information reserving bandwidth with customer premises equipment 14 for voice, data, or other applications and, in response, store bandwidth information indicating the bandwidth between gateway 18 and customer premises equipment 14 reserved for voice, data, or other applications. Gateway 18 may also receive configuration information identifying the compression algorithms supported by IAD 26, MTA 28, or WNIU 30 and, in response, store compression information associating customer premises equipment 14 with the identified compression algorithms. In a particular embodiment, gateway 18 receives the configuration information from a network management system (NMS) 19. In an alternative embodiment, gateway 18 receives the configuration information from customer premises equipment 14. For example, at start-up, IAD 26, MTA 28, and WNIU 30 may communicate configuration information to gateway 18.

During operation, gateway 18 determines the bandwidth between gateway 18 and each customer premises equipment 14 and stores bandwidth information indicating the total bandwidth between gateway 18 and each customer premises equipment 14. Gateway 18 may determine the bandwidth between gateway 18 and each customer premises equipment 14 at fixed time intervals, in response to initiating communications with customer premises equipment 14, or using a queuing or other suitable methodology. In a particular embodiment, gateway 18 uses active performance measurement software to determine the bandwidth between gateway 18 and each customer premises equipment 14 serviced by gateway 18.

In response to receiving either a telephone call from telecommunication network 12 for one of the subscribers' terminal devices 32 or a telephone call from one of the subscribers' terminal devices 32 for telecommunication network 12, gateway 18 identifies IAD 26, MTA 28, or WNIU 30 supporting communication with terminal device 32 and selects a compression algorithm according to the bandwidth and compression information associated with identified IAD 26, MTA 28, or WNIU 30. Using the bandwidth information, gateway 18 determines the bandwidth available to support the communication, and using the compression information, gateway 18 identifies the compression algorithms supported by IAD 26, MTA 28, or WNIU 30. Gateway 18 selects one of the compression algorithms according to the available bandwidth. For example, if substantial bandwidth is available, gateway 18 may select a compression algorithm (such as G.711) that will provide a higher quality of service even though the communication will require greater bandwidth. Whereas, if little bandwidth is available, gateway 18 may select a compression algorithm (such as G.729) that uses less bandwidth but provides a lower quality of service. In a particular embodiment, gateway 18 selects the compression algorithm that provides the highest quality of service using the available bandwidth. In an alternative embodiment, gateway 18 selects a compression algorithm so as to maintain a threshold bandwidth for other applications.

Gateway 18 may also store subscriber information associating each subscriber with a class of service and select a compression algorithm for communications with a subscriber's terminal device 32 according to that subscriber's class of service. Each class of service may be associated with one or more compression algorithms. For example, one class of service may be associated with compression algorithms that use greater bandwidth and provide a higher quality of service, and another class of service may be associated with compression algorithms that use less bandwidth and, as a result, provide a lower quality of service. In a particular embodiment, gateway 18 employs compression algorithms that use greater bandwidth to provide first class subscribers a higher quality of service and employs compression algorithms that use less bandwidth to provide second class subscribers a lower quality of service. For example, gateway 18 may compress first-class subscribers' telecommunication information using G.711 or G.721 and compress second-class subscribers' telecommunication information using G.728 or G.729. When gateway 18 initiates communications with a subscriber's terminal device 32, gateway 18 determines the subscriber's class of service according to stored subscriber information. If the subscriber receives first class service, gateway 18 selects either G.711 or G.721, and if the subscriber receives second class service, gateway 18 selects either G.728 or G.729. Although this illustrative example involves only two classes of services and only two compression algorithm per class of service, gateway 18 may associate subscribers with any suitable number of classes of service, and each class of service may include any suitable number of compression algorithms. In a particular embodiment, gateway 18 identifies a subset of compression algorithms according to a subscriber's class of service and selects a compression algorithm from that subset according to the bandwidth or compression information associated with the subscriber's IAD 26, MTA 28, or WNIU 30.

After selecting a compression algorithm for a subscriber's call, gateway 18 communicates compression information identifying the selected algorithm to the subscriber's IAD 26, MTA 28, or WNIU 30. As a result, gateway 18 and the subscriber's IAD 26, MTA 28, or WNIU 30 can communicate telecommunication information compressed according to the selected algorithm. Gateway 18 receives telecommunication information for the subscriber from telecommunication network 12, compresses the telecommunication information according to the selected algorithm, generates data packets encapsulating the compressed telecommunication information, and communicates the data packets to the subscriber's customer premises equipment 14 using a DSL, cable, wireless, or other broadband distribution platform. The subscriber's IAD 26, MTA 28, or WNIU 30 receives the data packets, extracts the compressed telecommunication information from the data packets, de-compresses the telecommunication information according to the selected compression algorithm, generates an analog telephone signal using the de-compressed telecommunication information, and communicates the analog telephone signal to the subscriber's terminal device 32. The subscriber's IAD 26, MTA 28, or WNIU 30 also receives an analog telephone signals communicating telecommunication information from the subscriber's terminal devices 32. IAD 26, MTA 28, or WNIU 30 processes the analog telephone signals to generate digital telecommunication information, compresses the digital telecommunication information according to the selected compression algorithm, generates data packets encapsulating the compressed telecommunication information, and communicates the data packets to gateway 18 using a DSL, cable, wireless, or other broadband distribution platform. Gateway 18 receives the data packets, extracts the compressed telecommunication information from the data packets, de-compresses the telecommunication according to the selected compression algorithm, and communicates the de-compressed telecommunication information to telecommunication network 12.

Although FIG. 1 illustrates switch 16, gateway 18, DSLAM 20, CMTS 22, and BSC 24 as separate devices, the present invention contemplates that system 10 may include any combination of one or more devices at one or more locations that communicate telecommunication information between telecommunication network 12 and customer premises equipment 14 using a DSL, cable, wireless, or other suitable broadband platform. For example, in an alternative embodiment, a single device may perform the operations associated with gateway 18 and DSLAM 20, gateway 18 and CMTS 22, or gateway 18 and BSC 24.

Figures 2, 3:
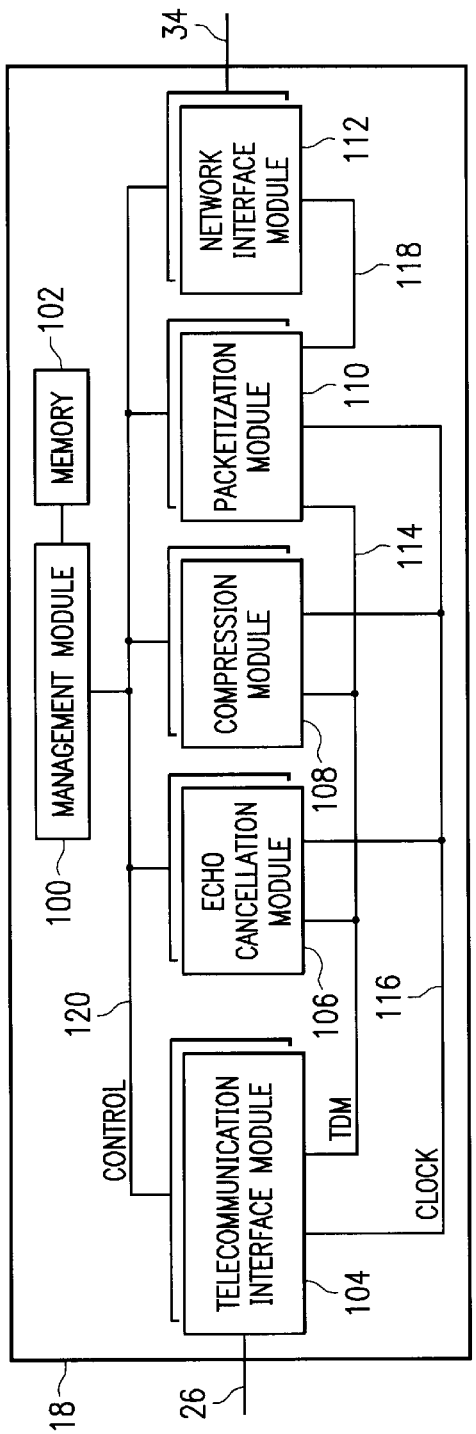
FIG. 2 illustrates a gateway that selects a compression algorithm for compressing telecommunication information communicated with customer premises equipment according to an available bandwidth.
FIG. 3 illustrates a table of customer premises information associating each customer premises equipment with bandwidth and compression information.

FIG. 2 illustrates gateway 18 that selects a compression algorithm for compressing telecommunication information communicated with customer premises equipment 14 according to an available bandwidth. Gateway 18 includes management module 100, memory 102, telecommunication interface modules (TIMs) 104, echo cancellation modules 106, compression modules 108, packetization modules 110, and network interface modules 112. Management module 100, TIMs 104, echo cancellation modules 106, compression modules 108, packetization modules 110, and network interface modules 112 represent functional elements that are reasonably self-contained so that each may be designed, constructed, and updated substantially independent of the others. Modules 100, 104, 106, 108, 110, and 112 may be implemented in hardware, software, or hardware and software. In a particular embodiment, module 100, 104, 106, 108, 110, and 112 are implemented on separate printed circuit boards that may be coupled to a backplane in gateway 18.

In the illustrated embodiment, a time division multiplexing (TDM) bus 114, a data packet bus 118, and a control bus 120 communicate telecommunication information, data packets, and control information within gateway 18. TDM bus 114 communicates several streams of telecommunication information among TIMs 104, echo cancellation modules 106, compression modules 108, and packetization modules 110. A clock signal 116 divides TDM bus 114 into a fixed sequence of time slots, and each stream of telecommunication information is assigned a different time slot in the sequence. In a particular embodiment, management module 100 assigns 64 kilobits per second (kb/s) time slots to each subscriber serviced by gateway 18 and stores subscriber profiles associating the assigned time slots with the subscribers in memory 102. Management module 100 may provision TDM bus 114 at the start-up of gateway 18 to support fixed time slot assignments or during operation of gateway 18 to support dynamic time slot assignments. Data packet bus 118 communicates data packets between packetization modules 110 and network interface modules 112, and control bus 120 communicates control information between management module 100 and TIMs 104, echo cancellation modules 106, compression modules 108, packetization modules 110, and network interface modules 112.

Although the particular embodiment of gateway 18 described with reference to FIG. 2 includes three different busses 114, 118, and 120, gateway 18 may use any combination of dedicated or shared communication paths to communicate telecommunication information, data packets, and control information among modules 100, 104, 106, 108, 110, and 112. For example, in an alternative embodiment, a hybrid bus (such as an IEEE 802.6 bus) may communicate telecommunication information between TIMs 104, echo cancellation modules 106, compression modules 108, and packetization modules 110 and also communicate data packets between packetization modules 110 and network interface modules 112.

Management module 100 manages the operation of gateway 18 using bandwidth, compression, and subscriber information stored in memory 102. Although memory 102 appears internal to gateway 18 in FIG. 2, memory 102 may be internal to or external from gateway 18 according to particular needs. In a particular embodiment, management module 100 is software implemented on a system controller.

To configure gateway 18, management module 100 selects a combination of TIMs 104, echo cancellation modules 106, compression modules 108, packetization modules 110, and network interface modules 112 to service each subscriber and establishes a communication path for each subscriber among the selected combination of TIMs 104, echo cancellation modules 106, compression modules 108, packetization modules 110, and network interface modules 112. In the illustrated embodiment, management module 110 assigns each subscriber one or more time slots in TDM bus 114 for communicating telecommunication information among TIMs 104, echo cancellation modules 106, compression modules 108, and packetization modules 110. To implement the configuration, management module 100 communicates control information to TIMs 104, echo cancellation modules 106, compression modules 108, packetization modules 110, and network interface modules 112. Management module 100 may statically configure gateway 18 at start-up or dynamically configure gateway 18 in response to receiving a telephone call.

During operation, management module 100 determines the bandwidth between gateway 18 and each customer premises equipment 14 and updates the bandwidth information stored in memory 102 to indicate the determined bandwidth between gateway 18 and each customer premises equipment 14. Management module 100 may determine the bandwidth between gateway 18 and each customer premises equipment 14 at fixed time intervals, in response to initiating communications with customer premises equipment 14, or using a queuing or other suitable methodology. In a particular embodiment, management module 100 uses active performance measurement software to determine the bandwidth between gateway 18 and each customer premises equipment 14 serviced by gateway 18.

When gateway 18 receives either a telephone call from telecommunication network 12 for one of the subscribers' terminal devices 32 or a telephone call from one of the subscribers' terminal devices 32 for telecommunication network 12, management module 100 selects a compression algorithm according to the bandwidth and compression information stored in memory 102. Management module 100 identifies the compression algorithms supported by the subscriber's IAD 26, MTA 28, or WNIU 30 using the stored compression information and determines the bandwidth available to support the communication using the stored bandwidth information. Management module 100 selects one of the compression algorithms according to the available bandwidth. In a particular embodiment, management module 100 selects the compression algorithm that provides the highest quality of service using the available bandwidth. In an alternative embodiment, management module 100 selects a compression algorithm so as to maintain a threshold bandwidth for other applications. Memory 110 may also store subscriber information associating each subscriber with a class of service, and management module 100 may select a compression algorithm according to a subscriber's class of service. After selecting a compression algorithm for a subscriber's call, management module 100 communicates compression information identifying the selected algorithm to the subscriber's IAD 26, MTA 28, or WNIU 30 and configures compression modules 108 to compress the subscriber's telecommunication information using the selected algorithm.

TIMs 104 communicate telecommunication information with switch 16 using several, alternative interfaces 26. Each TIM 104 may communicate telecommunication information using either a single type of interface 26 or several, different types of interfaces 26. During configuration, TIMs 104 receive control information identifying subscribers' interfaces 26 and assigned time slots in TDM bus 114. Once configured, TIMs 104 receive telecommunication information for subscribers from interfaces 26, process the telecommunication information for communication using TDM bus 114, and communicate the telecommunication information to the subscribers' assigned time slots in TDM bus 114. TIMs 104 also receive telecommunication information from subscribers' time slots in TDM bus 114, process the telecommunication information according to the subscribers' corresponding interfaces 26, and communicate the telecommunication information to switch 16 using the subscribers' corresponding interfaces 26.

In a particular embodiment, one of TIMs 104 communicates analog telephone signals with switch 16 using unbundled analog lines. In such an embodiment, TIM 104 receives analog telephone signals communicating telecommunication information from switch 16, processes the analog telephone signals to generate digital telecommunication information, and communicates the digital telecommunication information to TDM bus 114. TIM 104 also receives digital telecommunication information from TDM bus 114, generates analog telephone signals for communicating the telecommunication information, and communicates the analog telephone signals to switch 16 using unbundled analog lines. In an alternative embodiment, TIMs 104 communicates digital telecommunication information with switch 16 using a GR-303, TR-8, SS7 or other suitable digital interface.

Echo cancellation modules 106 selectively perform echo cancellation on telecommunication information to isolate and filter unwanted noise. During configuration, echo cancellation modules 106 receive, from management module 100, control information identifying telecommunication information on which echo cancellation modules 106 should perform echo cancellation. In a particular embodiment, the control information identifies subscribers' assigned time slots in TDM bus 114. Once configured, echo cancellation modules 106 receive telecommunication information from TDM bus 114, perform echo cancellation on the telecommunication information, and communicate the telecommunication information back to TDM bus 114.

Compression modules 108 compress and de-compress telecommunication information using several, alternative compression algorithms. During configuration, compression modules 108 receive, from management module 100, control information identifying telecommunication information that compression modules 108 should compress or de-compress. In a particular embodiment, the control information identifies subscribers' assigned time slots in TDM bus 114. Once configured, compression modules 108 receive telecommunication information from TIMs 104 or echo cancellation modules 106 using TDM bus 114, compress the telecommunication information, and communicate the compressed telecommunication information to packetization modules 110 using TDM bus 114. Compression modules 108 also receive compressed telecommunication information from packetization modules 110 using TDM bus 114, de-compress the telecommunication information, and communicate the de-compressed telecommunication information to TIMs 104 or echo cancellation modules 106 using TDM bus 114.

Compression modules 108 may compress and de-compress telecommunication information using G.711, G.722, G.723, G.728, G.729, or any other suitable compression algorithm. In a particular embodiment, each compression module 108 supports a separate compression algorithm. In an alternative embodiment, each compression module 108 supports several, different compression algorithms, and each compression module 108 compresses or de-compresses a subscriber's telecommunication information using a compression algorithm selected according to control information received from management module 100.

Packetization modules 110 process subscribers' telecommunication information according to several, alternative data communication protocols. During configuration, packetization modules 110 receive, from management module 100, control information identifying subscribers' assigned time slots in TDM bus 114 and destination addresses. Once configured, packetization modules 110 receive telecommunication information from TDM bus 114 using a subscriber's assigned time slot. Packetization modules 110 may receive either compressed telecommunication information from compression modules 108 or uncompressed telecommunication information from TIMs 104 or echo cancellation modules 106. Packetization modules 110 encapsulate the telecommunication information in data packets, assign the data packets the subscribers' destination address, and communicate the data packets to network interface modules 112. Packetization modules 110 also receive data packets from network interface modules 112. Packetization modules 116 extract telecommunication information from the data packets, identify a subscriber associated with the telecommunication information, and communicate the telecommunication information to TDM bus 114 using the subscriber's assigned time slot in TDM bus 114. (If the extracted telecommunication information is compressed, compression modules 108 receive the telecommunication information from TDM bus 114; if the extracted telecommunication information is uncompressed, either TIMs 104 or echo cancellation modules 106 receive the telecommunication information from TDM bus 114.) Packetization modules 110 may identify the subscriber based on the source or destination address of the data packets or a subscriber identifier included in the data packets.

Packetization modules 110 may employ IP, ATM, frame relay, or any other suitable data communication protocol to generate and process data packets. In a particular embodiment, each packetization module 110 supports a separate data communication protocol. In an alternative embodiment, each packetization module 110 supports several, alternative data communication protocols, and each packetization module 110 communicates a subscriber's telecommunication information using a protocol selected according to control information received from management module 100.

Network interface modules 112 communicate data packets between packetization modules 110 and data links 34. Network interface modules 112 may be coupled to DS-1 lines, DS-3 lines, OC-3 lines, or any other suitable data links 34. Network interface modules 112 receive data packets from packetization modules 110 and communicate the data packets to data links 34. Network interface modules 112 also receive data packets from data links 34 and communicate the data packets to packetization modules 110. In a particular embodiment, each network interface module 112 supports a single data link 34. In an alternative embodiment, each network interface module 112 supports several, alternative data links 34, and network interface modules 112 communicate data packets to data links 34 selected according to either the data packets' destination address or control information received from management module 100. The type of data packets generated by packetization modules 110 and the type of data links 34 used by network interface modules 112 may differ according to the type of DSL, cable, wireless, satellite, or other broadband platform used to communicate with a subscriber's customer premises equipment 14.

Although the particular embodiment of gateway 18 described in detail with reference to FIG. 2 includes management module 100, memory 102, TIMs 104, echo cancellation modules 106, compression modules 108, packetization modules 110, and network interface modules 112, gateway 18 may include any combination of hardware, software, or hardware and software that communicates telecommunication information and selects a compression algorithm for compressing the telecommunication information according to an available bandwidth.

FIG. 3 illustrates a table 200 of customer premises information associating each customer premises equipment 14 with bandwidth and compression information. Management module 100 stores the customer premises information in memory 102 using arrays, linked lists, pointers or any other suitable data programming techniques, organization, or arrangement. Gateway 18 uses the customer premises information to select compression algorithms for compressing telecommunication information communicated with each customer premises equipment 14.

Column 202 identifies customer premises equipment 14 serviced by gateway 18. Although the customer premises equipment identifiers in column 202 are numbers, gateway 18 may use names, addresses, telephone numbers, or any other suitable information to identify customer premises equipment 14.

Columns 204, 206, 208, 210, 212, and 214 associate each customer premises equipment 14 with bandwidth information. Column 204 indicates the total bandwidth between gateway 18 and each customer premises equipment 14. Column 206 indicates the bandwidth with each customer premises equipment 14 reserved for data applications, and column 208 indicates the bandwidth reserved for voice applications. Column 210 indicates the bandwidth with each customer premises equipment 14 allocated for data applications, and column 212 indicates the bandwidth allocated for voice applications. Column 214 indicates the bandwidth available for voice applications for each customer premises equipment 14.

Column 216 associates each customer premises equipment 14 identified in column 202 with compression information by indicating one or more voice compression algorithms supported by each customer premises equipment 14.

When customer premises equipment 14 is added to system 10, gateway 18 receives configuration information relating to customer premises equipment 14 and, in response, stores bandwidth and compression information in table 200. Gateway 18 may receive configuration information reserving bandwidth with customer premises equipment 14 for data and voice applications and, in response, store bandwidth information in columns 206 and 208 indicating the bandwidth reserved for data and voice applications, respectively. Gateway 18 also initializes column 210 and 212 to indicate that no bandwidth with customer premises equipment 14 is allocated for data or voice applications. In addition, gateway 18 receives configuration information identifying the compression algorithms supported by customer premises equipment 14 and, in response, stores compression information associating customer premises equipment 14 with the identified algorithms in column 216.

Gateway 18 determines the bandwidth between gateway 18 and each customer premises equipment 14 and stores bandwidth information indicating the total bandwidth between gateway 18 and each customer premises equipment 14 in column 204. Based on the total bandwidth in column 204, the reserved bandwidth in columns 206 and 208, and the allocated bandwidth in columns 210 and 212, gateway 18 can calculate the available bandwidth for voice applications and store bandwidth information indicating the available bandwidth in column 214. During operation, gateway 18 regularly monitors the bandwidth between gateway 18 and each customer premises equipment 14 and updates the bandwidth information stored in columns 204 and 214 accordingly. Gateway 18 may determine the bandwidth between gateway 18 and each customer premises equipment 14 at fixed time intervals, in response to initiating communications with customer premises equipment 14, or using a queue or other suitable methodology.

When gateway 18 receives either a telephone call from telecommunication network 12 for a subscriber's terminal device 32 or a telephone call from a subscriber's terminal device 32 for telecommunication network 12, gateway 18 identifies customer premises equipment 14 supporting communication with terminal device 32 and selects a compression algorithm for the communication according to the bandwidth information in columns 204, 206, 208, 210, 212, and 214 and the compression information in column 216. Using the bandwidth information in column 214, gateway 18 can determine the bandwidth available to support the communication with customer premises equipment 14, and using the compression information in column 216, gateway 18 can identify the compression algorithms supported by customer premises equipment 14. Gateway 18 selects one of the compression algorithms in column 216 according to the available bandwidth in column 214.

For example, if gateway 18 initiates communication with one of terminal devices 32 supported by MTA #35 in column 202, substantial bandwidth is available according to column 214. As a result, gateway 18 may select G.711 as opposed to G.728 from column 216 to provide a higher quality of service even though the communication will require a greater bandwidth. Whereas, if gateway 18 initiates communication with one of terminal devices 32 supported by IAD #23 in column 202, little bandwidth is available in column 214. Consequently, gateway 18 may select G.723 as opposed to G.711 in column 216 to preserve bandwidth even though G.723 provides a lower quality of service. In a particular embodiment, gateway 18 selects the compression algorithm in column 216 that provides the highest quality of service using the available bandwidth in column 214.

FIG. 4 illustrates a table 250 of subscriber information associating each subscriber with a class of service and bandwidth and compression information. Management module 100 stores the subscriber information in memory 102 using arrays, linked lists, pointers, or any other suitable data programming techniques. Using the subscriber information, gateway 18 selects compression algorithms for communications with a subscriber's terminal device 32 according to that subscriber's class of service.

Column 252 identifies one of customer premises equipment 14 serviced by gateway 18, and column 254 identifies the subscribers serviced by that customer premises equipment 14. Although the customer premises equipment identifier in column 252 and the subscriber identifiers in column 254 are numbers, gateway 18 may use names, addresses, telephone numbers, or any other suitable information to identify customer premises equipment 14 and the subscribers serviced by that customer premises equipment 14.

Column 256 associates each subscriber in column 254 with a class of service. Each class of service in column 256 may be associated with one or more compression algorithms supported by customer premises equipment 14 in column 252. For example, one class of service may be associated with compression algorithms that use greater bandwidth and provide a higher quality of service, and another class of service may be associated with voice compression algorithms that use less bandwidth and, as a result, provide a lower quality of service. For example, in the illustrated embodiment, the first class of service is associated with G.711, and the second class of service is associated with G.722 and G.729.

Column 258 indicates whether subscriber line 46 associated with each subscriber in column 254 is active or inactive. If subscriber line 46 is active, column 260 indicates the compression algorithms selected by gateway 18 for communications over subscriber line 46, and column 262 indicates the bandwidth allocated to support the communications over subscriber line 46.

In operation, gateway 18 receives configuration information relating to the subscribers serviced by customer premises equipment 14 and, in response, stores subscriber information in table 250. The configuration information indicates each subscriber's assigned class of service and the characteristics of each class of service. Gateway 18 may receive the configuration information from either NMS 19 or customer premises equipment 14 servicing the subscribers.

When gateway 18 receives either a telephone call from telecommunication network 12 for a subscriber's terminal device 32 or a telephone call from a subscriber's terminal device 32 for telecommunication network 12, gateway 18 identifies the subscriber using column 254, determines that subscriber's class of service using column 256, and selects a compression algorithm for that subscriber's communications according to the subscriber's class of service. In a particular embodiment, a class of service is associated with a subset of compression algorithms supported by the subscriber's customer premises equipment 14, and gateway 18 selects a compression algorithm from that subset according to the bandwidth or compression information associated with the subscriber's customer premises equipment 14. For example, in the illustrated embodiment, the second class of service is associated with G.722 and G.729, and gateway 18 selects one of these two compression algorithm for a second class subscriber according to the bandwidth or compression information associated with the subscriber's customer premises equipment 14. In an alternative embodiment, a class of service may be associated with a single compression algorithm, and gateway 18 selects the specified compression algorithm for that class of subscribers. For example, in the illustrated embodiment, the first class of service is associated with G.711, and gateway 18 compresses the first class subscribers' communications using G.711. Although table 250 illustrates only two classes of service, gateway 18 may associate subscribers with any suitable number of classes of service, and each class of service may include any suitable number of compression algorithms.

FIG. 5 is a table 300 illustrating the change of bandwidth and selection of compression algorithms over time, where gateway 18 selects compression algorithms to provide the highest quality of service using available bandwidth. Rows 302, 304, 306, and 308 provide bandwidth information relating to the state of communications between gateway 18 and customer premises equipment 14. Row 302 indicates the total bandwidth between gateway 18 and customer premises equipment 14, row 304 indicates the bandwidth allocated for data communications, row 306 indicates the bandwidth allocated for voice communications, and row 308 indicates the available bandwidth between gateway 18 and customer premises equipment 14. To demonstrate the selection of compression algorithms over time, rows 310, 312, 314, and 316 identify voice compression algorithms selected to support communications for specific subscribers.

At time T1, the total bandwidth between gateway 18 and customer premises equipment 14 is 500 kilobits per second (Kbps). 300 Kbps is allocated for data communications in row 34, leaving 200 Kbps of available bandwidth in row 308.

At time T2, gateway 18 initiates communication with a first subscriber in row 310. Because 200 Kbps of bandwidth is available in row 308, gateway 18 selects G.711 to compress communications with the first subscriber. G.711 uses 64 Kbps to provide the highest quality of service, increasing the bandwidth allocated for voice applications to 64 Kbps in row 306 and reducing the available bandwidth to 136 Kbps in row 308.

At time T3, gateway 18 initiates communication with a second subscriber in row 312. Again, because G.711 provides the highest quality of service and there is enough available bandwidth between gateway 18 and the subscriber's customer premises equipment 14 to support G.711 in row 308, gateway 18 selects G.711 to compress communications with the second subscriber in row 312. Because G.711 uses 64 Kbps, the bandwidth allocated for voice is increased to 128 Kbps in row 306, and the available bandwidth is reduced to 72 Kbps in row 308.

At time T4, as a result of its regular monitoring of the bandwidth between gateway 18 and each customer premises equipment 14, gateway 18 determines that the total bandwidth with customer premises equipment 14 has decreased from 500 Kbps to 450 Kbps and, accordingly, modifies the bandwidth information in row 302. Such a reduction in total bandwidth may result from signal interference, performance degradation, environmental factors, or other dynamic causes. Gateway 18 also reduces the available bandwidth in row 308 from 72 Kbps to 22 Kbps.

At time T5, gateway 18 initiates communications with a third subscriber in row 314. Because only 22 Kbps of bandwidth is available in row 308, gateway 18 cannot select G.711 to compress the third subscriber's communications. Instead, gateway 18 selects G.728, which uses less bandwidth. Because G.728 uses 16 Kbps, the bandwidth allocated for voice increases from 128 to 144 Kbps in row 306, and the available bandwidth decreases from 22 Kbps to 6 Kbps in row 308.

At time T6, the total bandwidth between gateway 18 and customer premises 14 increases from 450 Kbps to 500 Kbps, as indicated in row 302. As a result, the available bandwidth in row 308 also increases from 6 Kbps to 56 Kbps.

At time T7, gateway 18 initiates communications with a fourth subscriber in row 316. Because only 56 Kbps is available in row 308 and G.711 requires 64 Kbps, gateway 18 cannot select G.711 to compress the fourth subscriber's communications. Instead, gateway 18 selects G.728, which requires only 16 Kbps. The bandwidth allocated for voice applications in row 306 increases from 144 Kbps to 160 Kbps, and the available bandwidth in row 308 decreases from 56 Kbps to 40 Kbps at time T7.

Table 300 is only a particular example of the way in which gateway 18 may select compression algorithms according to available bandwidth. In alternative embodiments, gateway 18 may not always select the compression algorithm that provides the highest quality of service using the available bandwidth.

FIG. 6 is a table 350 illustrating the change of bandwidth and selection of compression algorithms over time, where gateway 18 selects compression algorithms to maintain a threshold bandwidth. Table 350 is similar to table 300 in FIG. 5, except table 350 includes an additional row 359 that indicates a threshold bandwidth. Gateway 18 selects compression algorithms for communications so that the available bandwidth in row 358 exceeds the threshold bandwidth in row 359. In this particular embodiment, the threshold bandwidth is the minimum amount of bandwidth that is necessary to support communications with the inactive subscribers. Because G.728 requires 16 Kbps, the threshold bandwidth is 16 Kbps multiplied by the number of inactive subscribers.

At time T1, the total bandwidth between gateway 18 and customer premises equipment 14 is 500 Kbps, as indicated in row 352. The bandwidth allocated for data applications is 300 Kbps in row 354, and the bandwidth allocated for voice application is 0 Kbps in row 356. As a result, the available bandwidth between gateway 18 and customer premises equipment 14 is 200 Kbps in row 358. The threshold bandwidth in row 359 is 16 Kbps multiplied by 4 inactive subscriber, or 64 Kbps.

At time T2, gateway 18 initiates communication with terminal device 32 of a first subscriber in row 360. As a result, the threshold bandwidth in row 359 is reduced to 16 Kbps multiplied by 3 inactive subscribers, or 48 Kbps. Because using 64 Kbps to support a G.711 communication will not reduce the available bandwidth in row 358 below the 48 Kbps threshold bandwidth in row 359, gateway 18 selects G.711 to compress the first subscriber's communications. As a result, the bandwidth allocated for voice applications increases from 0 Kbps to 64 Kbps in row 356, and the available bandwidth decreases from 200 Kbps to 136 Kbps in row 358.

At time T3, due to increased data traffic between gateway 18 and customer premises equipment 14, the bandwidth allocated for data applications increases from 300 Kbps to 350 Kbps in row 354. As a result, the available bandwidth decreases from 136 Kbps to 86 Kbps in row 358.

At time T4, gateway 18 initiates communication with terminal device 32 of a second subscriber in row 362. As a result, the threshold bandwidth in row 359 is reduced to 16 Kbps multiplied by 2 inactive subscribers, or 32 Kbps. Because using 64 Kbps to support a G.711 communication will reduce the available bandwidth in row 358 below the 32 Kbps threshold bandwidth in row 359, gateway 18 does not select G.711 to compress the second subscriber's communications. Instead, gateway 18 selects G.728, which requires only 16 Kbps. The bandwidth allocated for voice applications increases from 64 Kbps to 80 Kbps in row 356, and the available bandwidth decreases from 86 Kbps to 70 Kbps in row 358.

At time T5, gateway 18 initiates communications with terminal device 32 of a third subscriber in row 364. As a result, the threshold bandwidth in row 359 is reduced to 16 Kbps for 1 inactive subscriber. Because using 64 Kbps to support a G.711 communication will reduce the available bandwidth in row 358 below the 16 Kbps threshold bandwidth in row 359, gateway 18 does not select G.711 to compress the third subscriber's communications. Instead, gateway 18 selects G.728. The bandwidth allocated for voice applications increases from 80 Kbps to 96 Kbps in row 356, and the available bandwidth decreases from 70 Kbps to 54 Kbps in row 358.

At time T6, the data traffic between gateway 18 and customer premises equipment 14 decreases. As a result, the bandwidth allocated for data applications decreases from 350 Kbps to 300 Kbps in row 354, and the available bandwidth increases from 54 Kbps to 104 Kbps in row 358.

At time T7, gateway 18 initiates communication with terminal device 32 of a fourth subscriber in row 366. As a result, the threshold bandwidth in row 359 is reduced to 0 Kbps because there are no inactive subscribers. Using 64 Kbps to support a G.711 communication will not reduce the available bandwidth in row 358 below the threshold bandwidth in row 359, so gateway 18 selects G.711 to compress the fourth subscriber's communications. As a result, the bandwidth allocated for voice applications increases from 96 Kbps to 160 Kbps in row 356, and the available bandwidth decreases from 104 Kbps to 40 Kbps in row 358.

Table 350 is only a particular example of a way in which gateway 18 may select compression algorithms to maintain a threshold bandwidth. In an alternative embodiment, the threshold bandwidth may be a fixed number, or the threshold bandwidth may include a larger buffer to allow for fluctuations in data traffic or to provide inactive subscribers a higher quality of voice service.

Figure 7A:
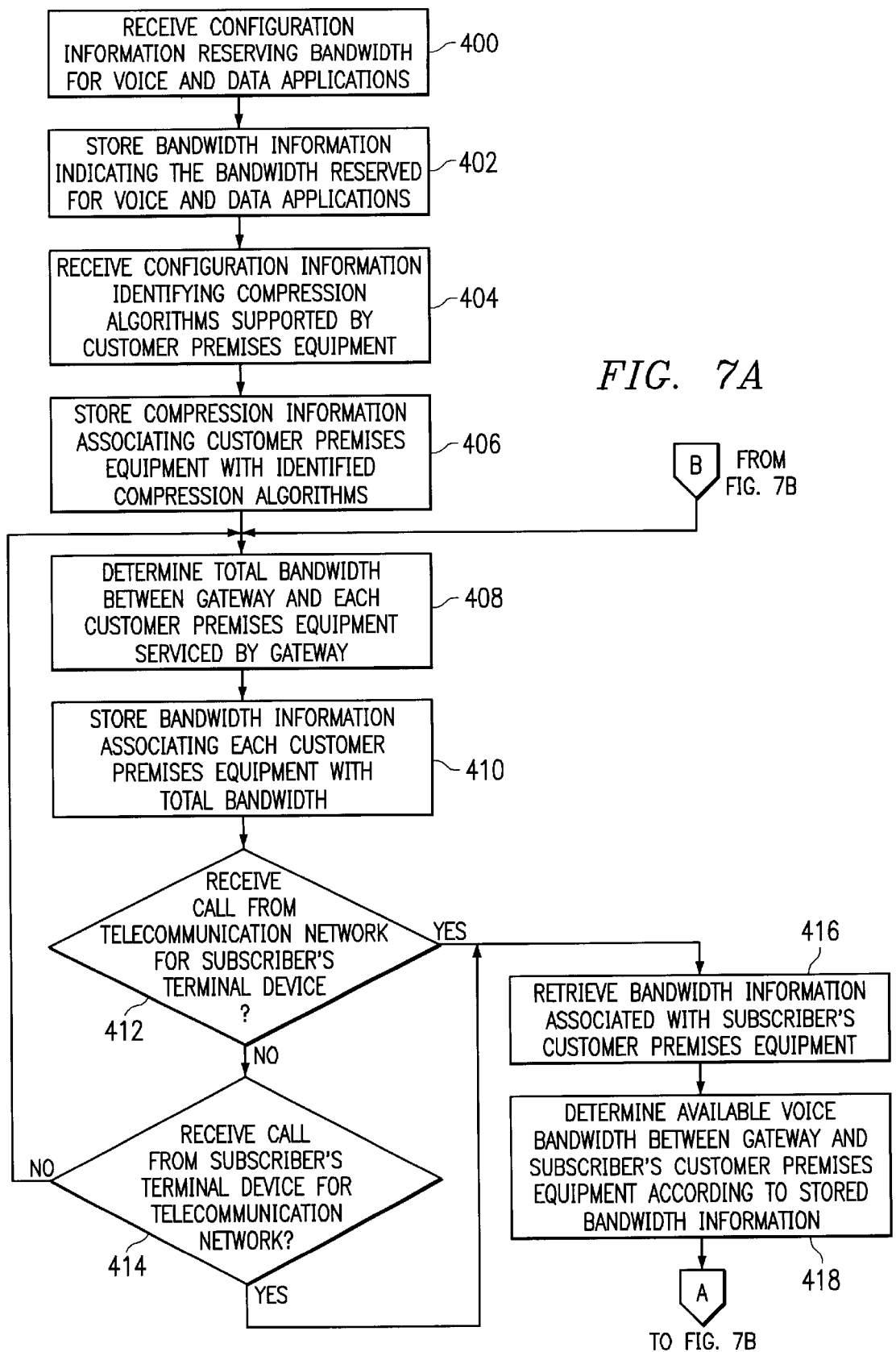
FIG. 7 is a flowchart of a method of selecting a compression algorithm for compressing telecommunication information communicated between a gateway and customer premises equipment to provide the highest quality of service using an available bandwidth.

FIG. 7 is a flowchart of a method of selecting a compression algorithm for compressing telecommunication information communicated between gateway 18 and customer premises equipment 14 to provide the highest quality of service using an available bandwidth. The method begins at step 400, where gateway 18 receives configuration information reserving bandwidth with each customer premises equipment 14 for voice and data applications. Gateway 18 stores bandwidth information indicating the bandwidth with each customer premises equipment 14 reserved for voice and data applications at step 402. Gateway 18 receives configuration information identifying compression algorithms supported by each customer premises equipment 14 at step 404 and stores compression information associating customer premises equipment 14 with the identified algorithms at step 406.

At step 408, gateway 18 determines the total bandwidth between gateway 18 and each customer premises equipment 14 and stores bandwidth information associating each customer premises equipment 14 with the determined total bandwidth at step 410. If gateway 18 receives a call from telecommunication network 12 for a subscriber's terminal device 32 at step 412 or receives a call from a subscriber's terminal device 32 for telecommunication network 12 at step 414, the method continues at step 416. Otherwise, the method returns to step 408, where gateway 18 updates the stored bandwidth information.

At step 416, gateway 18 retrieves the stored bandwidth information associated with the subscriber's customer premises equipment 14, and gateway 18 determines the available voice bandwidth between gateway 18 and the subscriber's customer premises equipment 14 according to the stored bandwidth information at step 418. Gateway 18 retrieves the compression information indicating the compression algorithms supported by the subscriber's customer premises equipment 14 at step 420 and selects the compression algorithm that provides the highest quality of service at step 422.

At step 424, gateway 18 determines whether the available bandwidth can support the communication of telecommunication information compressed according to the selected algorithm. If the available bandwidth cannot support the communication of telecommunication information compressed according the selected algorithm, gateway 18 selects the compression algorithm that provides the next highest quality of service at step 426, and the method continues at step 424. If the available bandwidth can support the communication of telecommunication information compressed according the selected compression algorithm, gateway 18 communicates to the subscriber's customer premises equipment 14 compression information identifying the selected compression algorithm at step 428. Gateway 18 communicates telecommunication information with the subscriber's customer premises equipment 14 using the selected compression algorithm at step 430 and the method continues at step 408.

Figure 8B:
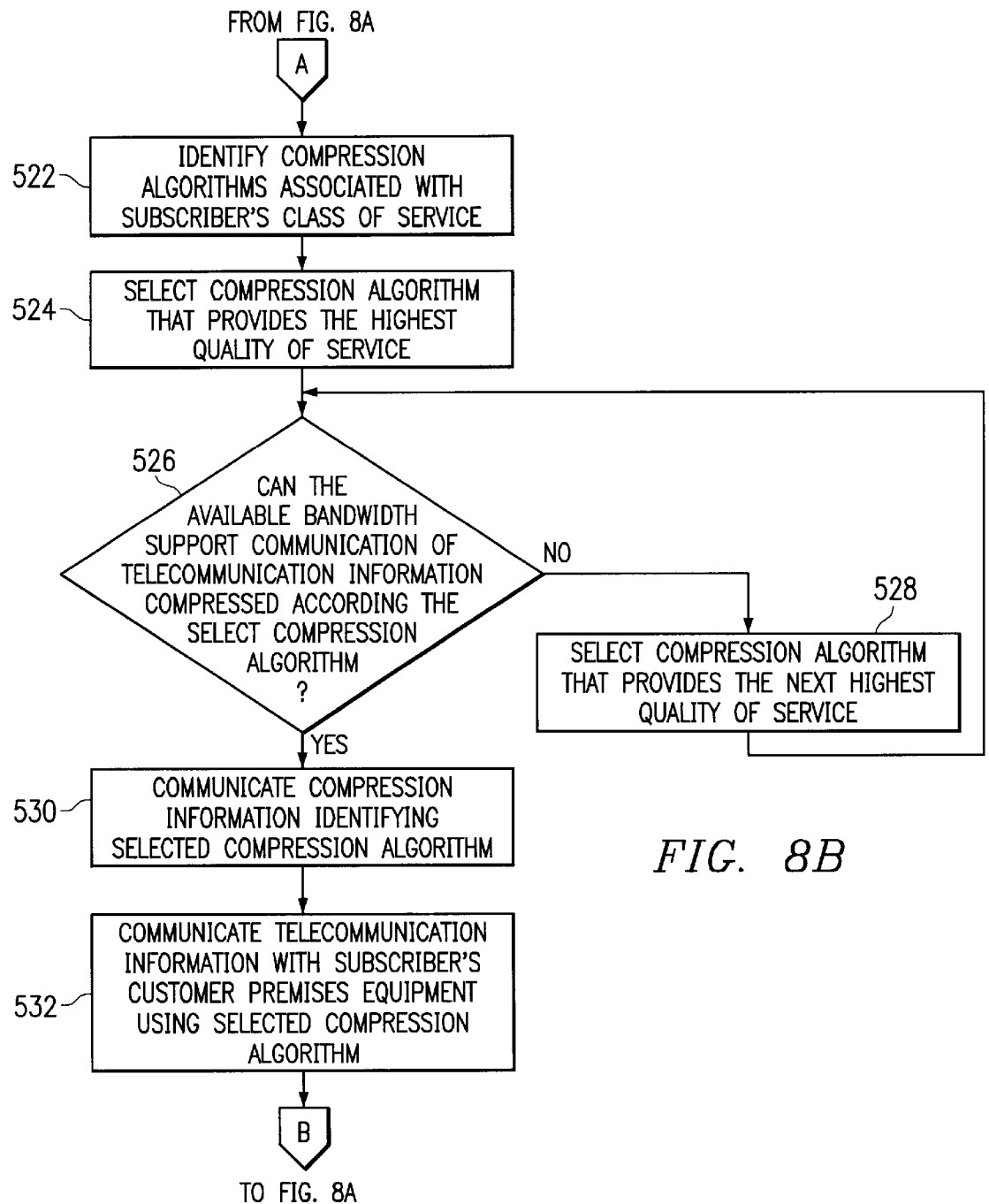
FIG. 8 is a flowchart of a method of selecting a compression algorithm for compressing telecommunication information communicated between a gateway and customer premises equipment according to a subscriber's class of service and an available bandwidth between the gateway and customer premises equipment.

FIG. 8 is a flowchart of a method of selecting a compression algorithm for compressing telecommunication information communicated between gateway 18 and customer premises equipment 14 according to a subscriber's class of service and available bandwidth between gateway 18 and customer premises equipment 14. The method begins at step 500, where gateway 18 receives configuration information reserving bandwidth with each customer premises equipment 14 for voice and data applications. Gateway 18 stores bandwidth information indicating the bandwidth with each customer premises equipment 14 reserved for voice and data applications at step 502. Gateway 18 receives configuration information identifying compression algorithms supported by each customer premises equipment 14 at step 504 and stores compression information associating each customer premises equipment 14 with the identified algorithms at step 506.

At step 508, gateway 18 determines the total bandwidth between gateway 18 and each customer premises equipment 14 and stores bandwidth information associating each customer premises equipment 14 with the determined total bandwidth at step 510. If gateway 18 receives a call from telecommunication network 12 for a subscriber's terminal device 32 at step 512 or receives a call from a subscriber's terminal device 32 for telecommunication network 12 at step 514, the method continues at step 516. Otherwise, the method returns to step 508, where gateway 18 updates the stored bandwidth information.

At step 516, gateway 18 retrieves the stored bandwidth information associated with the subscriber's customer premises equipment 14, and gateway 18 determines the available voice bandwidth between gateway 18 and the subscriber's customer premises equipment 14 according to the stored bandwidth information at step 518. Gateway 18 retrieves the subscriber information associating the subscriber with a class of service at step 520. Gateway 18 identifies the compression algorithms associated with the subscriber's class of service at step 522 and selects the compression algorithm that provides the highest quality of service at step 524.

At step 526, gateway 18 determines whether the available bandwidth can support the communication of telecommunication information compressed according to the selected algorithm. If the available bandwidth cannot support the communication of telecommunication information compressed according the selected algorithm, gateway 18 selects the compression algorithm that provides the next highest quality of service at step 528, and the method continues at step 526. If the available bandwidth can support the communication of telecommunication information compressed according the selected compression algorithm, gateway 18 communicates to the subscriber's customer premises equipment 14 compression information identifying the selected compression algorithm at step 530. Gateway 18 communicates telecommunication information with the subscriber's customer premises equipment 14 using the selected compression algorithm at step 532 and the method continues at step 508.

Although an embodiment of the invention and its advantages are described in detail, a person skilled in the art could make various alterations, additions, and omissions with departing from the spirit and scope of the present invention as defined by the appended claims.

What is claimed is:

1. A gateway for communicating telecommunication information between a telecommunication network and customer premises equipment, the gateway comprising:
   a telecommunication interface operable to receive telecommunication information from the telecommunication network for communication to the customer premises equipment;
   a management module operable to determine a bandwidth available to communicate the telecommunication information to the customer premises equipment and to select a compression algorithm according to the available bandwidth;
   a compression module operable to compress the telecommunication information using the selected compression algorithm; and
   a packetization module operable to generate data packets for communicating the telecommunication information,
   wherein the management module determines the available bandwidth by determining a total bandwidth between the gateway and the customer premises equipment and subtracting a bandwidth allocated to or reserved for other applications.

2. The gateway of claim 1, wherein the customer premises equipment is an integrated access device (IAD) operable to receive the data packets using a digital subscriber line, a media terminal adapter (MTA) operable to receive the data packets using a cable line, or a wireless network interface unit (WNIU) operable to receive the data packets using a wireless link.

3. The gateway of claim 1, wherein the management module determines the total bandwidth by using active performance measurement (APM) software.

4. The gateway of claim 1, further comprising:
   a memory operable to store customer premises information associating the customer premises equipment with one or more compression algorithms;
   wherein the management module is further operable to select the compression algorithm for the telecommunication information using the customer premises information.

5. The gateway of claim 1, wherein the management module is further operable to select the compression algorithm to maintain a threshold bandwidth for other applications.

6. A gateway for communicating telecommunication information between a telecommunication network and customer premises equipment, the gateway comprising:
   a telecommunication interface operable to receive telecommunication information from the telecommunication network for communication to the customer premises equipment;
   a management module operable to determine a bandwidth available to communicate the telecommunication information to the customer premises equipment and to select a compression algorithm according to the available bandwidth;
   a compression module operable to compress the telecommunication information using the selected compression algorithm;
   a packetization module operable to generate data packets for communicating the telecommunication information; and
   a memory operable to store customer premises information associating the customer premises equipment with one or more compression algorithms;
   wherein the management module is further operable to select the compression algorithm for the telecommunication information using the customer premises information, wherein the management module selects the compression algorithm for the telecommunication information by identifying the compression algorithm that can provide a highest quality of service using the available bandwidth with the customer premises equipment.

7. A gateway for communicating telecommunication information between a telecommunication network and customer premises equipment, the gateway comprising:
   a telecommunication interface operable to receive telecommunication information from the telecommunication network for communication to the customer premises equipment;
   a management module operable to determine a bandwidth available to communicate the telecommunication information to the customer premises equipment and to select a compression algorithm according to the available bandwidth;
   a compression module operable to compress the telecommunication information using the selected compression algorithm;
   a packetization module operable to generate data packets for communicating the telecommunication information; and
   a memory operable to store subscriber information associating each of a plurality of subscribers with a class of service;
   wherein the management module is further operable to identify a subscriber for the telecommunication information, to identify a class of service associated with the subscriber, and to select the compression algorithm according to the class of service.

8. A method for communicating telecommunication information between a telecommunication network and customer premises equipment, the method comprising:

receiving telecommunication information from the telecommunication network for communication to the customer premises equipment;

determining a bandwidth available to communicate the telecommunication information to the customer premises equipment;

selecting a compression algorithm according to the available bandwidth;

compressing the telecommunication information using the selected compression algorithm; and generating data packets for communicating the telecommunication information, wherein determining the available bandwidth further comprises: determining a total bandwidth between the gateway and the customer premises equipment; and subtracting a bandwidth allocated to or reserved for other applications.

9. The method of claim 8, wherein the customer premises equipment is an integrated access device (IAD) operable to receive the data packets using a digital subscriber line, a media terminal adapter (MTA) operable to receive the data packets using a cable line, or a wireless network interface unit (WNIU) operable to receive the data packets using a wireless link.

10. The method of claim 8, wherein determining the total bandwidth further comprises using active performance measurement (APM) software.

11. The method of claim 8, further comprising:

storing customer premises information associating the customer premises equipment with one or more compression algorithms; and selecting the compression algorithm for the telecommunication information using the customer premises information.

12. The method of claim 8, further comprising selecting the compression algorithm to maintain a threshold bandwidth for other applications.

13. A method for communicating telecommunication information between a telecommunication network and customer premises equipment, the method comprising:

storing customer premises information associating the customer premises equipment with one or more compression algorithms;

receiving telecommunication information from the telecommunication network for communication to the customer premises equipment;

determining a bandwidth available to communicate the telecommunication information to the customer premises equipment;

selecting a compression algorithm according to the available bandwidth using the customer premises information;

compressing the telecommunication information using the selected compression algorithm; and generating data packets for communicating the telecommunication information, wherein selecting the compression algorithm for the telecommunication information further comprises selecting the compression algorithm that provides the highest quality of service using the available bandwidth.

14. A method for communicating telecommunication information between a telecommunication network and customer premises equipment, the method comprising:

storing subscriber information associating each of a plurality of subscribers with a class of service;

receiving telecommunication information from the telecommunication network for communication to the customer premises equipment;

determining a bandwidth available to communicate the telecommunication information to the customer premises equipment;

identifying a subscriber for the telecommunication information;

identifying a class of service associated with the subscriber;

selecting a compression algorithm according to the class of service and the available bandwidth;

compressing the telecommunication information using the selected compression algorithm; and generating data packets for communicating the telecommunication information.

15. A system for communicating telecommunication information between a telecommunication network and customer premises equipment, the system comprising:

a gateway operable to receive telecommunication information from the telecommunication network for communication to the customer premises equipment, to determine a bandwidth available to communicate the telecommunication information to the customer premises equipment, to select one of a plurality of compression algorithms according to the available bandwidth, to compress the telecommunication information using the selected compression algorithm, and to generate data packets for communicating the telecommunication information to the customer premises equipment; and a digital subscriber line access multiplexer (DSLAM) operable to communicate the data packets generated by the gateway to the customer premises equipment using a digital subscriber line;

wherein the available bandwidth relates to a bandwidth of the digital subscriber line between the DSLAM and the customer premises equipment.

16. A system for communicating telecommunication information between a telecommunication network and customer premises equipment, the system comprising:

a gateway operable to receive telecommunication information from the telecommunication network for communication to the customer premises equipment, to determine a bandwidth available to communicate the telecommunication information to the customer premises equipment, to select one of a plurality of compression algorithms according to the available bandwidth, to compress the telecommunication information using the selected compression algorithm, and to generate data packets for communicating the telecommunication information to the customer premises equipment; and a cable modem termination system (CMTS) operable to communicate the data packets generated by the gateway to the customer premises equipment using a cable link;

wherein the available bandwidth relates to a bandwidth of the cable link between the CMTS and the customer premises equipment.

17. A system for communicating telecommunication information between a telecommunication network and customer premises equipment, the system comprising:
- a gateway operable to receive telecommunication information from the telecommunication network for communication to the customer premises equipment, to determine a bandwidth available to communicate the telecommunication information to the customer premises equipment, to select one of a plurality of compression algorithms according to the available bandwidth, to compress the telecommunication information using the selected compression algorithm, and to generate data packets for communicating the telecommunication information to the customer premises equipment; and
- a base station controller (BSC) operable to communicate the data packets generated by the gateway to the customer premises equipment using a wireless link;
- wherein the available bandwidth relates to a bandwidth of the wireless link between the BSC and the customer premises equipment.

18. A system for communicating telecommunication information between a telecommunication network and customer premises equipment, the system comprising:
- a gateway operable to receive telecommunication information from the telecommunication network for communication to the customer premises equipment, to determine a bandwidth available to communicate the telecommunication information to the customer premises equipment, to select one of a plurality of compression algorithms according to the available bandwidth, to compress the telecommunication information using the selected compression algorithm, and to generate data packets for communicating the telecommunication information to the customer premises equipment;
- wherein the gateway determines the available bandwidth by determining a total bandwidth for communications with the customer premises equipment and subtracting a bandwidth allocated to or reserved for other applications.

19. The system of claim 18, wherein the gateway determines the total bandwidth by using active performance measurement (APM) software.

20. The system of claim 18, wherein:
- the customer premises equipment communicates, to the gateway, compression information indicating one or more compression algorithms supported by the customer premises equipment; and
- the gateway receives the compression information and selects the compression algorithm for the telecommunication information from the compression algorithms supported the customer premises equipment.

21. A system for communicating telecommunication information between a telecommunication network and customer premises equipment, the system comprising:
- a gateway operable to receive telecommunication information from the telecommunication network for communication to the customer premises equipment, to determine a bandwidth available to communicate the telecommunication information to the customer premises equipment, to select one of a plurality of compression algorithms according to the available bandwidth, to compress the telecommunication information using the selected compression algorithm, and to generate data packets for communicating the telecommunication information to the customer premises equipment;
- wherein the gateway selects the compression algorithm in response to determining that the compression algorithm provides a highest quality of service using the available bandwidth.

22. A system for communicating telecommunication information between a telecommunication network and customer premises equipment, the system comprising:
- a gateway operable to receive telecommunication information from the telecommunication network for communication to the customer premises equipment, to determine a bandwidth available to communicate the telecommunication information to the customer premises equipment, to select one of a plurality of compression algorithms according to the available bandwidth, to compress the telecommunication information using the selected compression algorithm, and to generate data packets for communicating the telecommunication information to the customer premises equipment;
- wherein the gateway is further operable to identify a subscriber for the telecommunication information, to identify a class of service associated with the subscriber, and to select the compression algorithm according to the class of service.

23. The system of claim 18, wherein the gateway is further operable to select the compression algorithm to maintain a threshold bandwidth for other applications.

* * * * *